(12) United States Patent
Breault

(10) Patent No.: US 11,053,114 B2
(45) Date of Patent: Jul. 6, 2021

(54) SINGLE SERVE POINT OF CONSUMPTION BEVERAGE DISPENSING VALVE

(71) Applicant: Michael John Breault, Redlands, CA (US)

(72) Inventor: Michael John Breault, Redlands, CA (US)

( * ) Notice: Subject to any disclaimer, the term of this patent is extended or adjusted under 35 U.S.C. 154(b) by 111 days.

(21) Appl. No.: 16/536,085

(22) Filed: Aug. 8, 2019

(65) Prior Publication Data

US 2020/0048066 A1 Feb. 13, 2020

Related U.S. Application Data

(60) Provisional application No. 62/716,296, filed on Aug. 8, 2018.

(51) Int. Cl.
*B67D 1/12* (2006.01)
*A23L 2/52* (2006.01)
*A23L 2/60* (2006.01)

(52) U.S. Cl.
CPC .............. *B67D 1/1279* (2013.01); *A23L 2/52* (2013.01); *A23L 2/60* (2013.01)

(58) Field of Classification Search
CPC ............ B67D 1/1279; A23L 2/52; A23L 2/60
See application file for complete search history.

(56) References Cited

U.S. PATENT DOCUMENTS

| | | | |
|---|---|---|---|
| 4,008,832 A | 2/1977 | Rodth | |
| 4,306,667 A | 12/1981 | Sedam et al. | |
| 4,676,401 A | 6/1987 | Fox et al. | |
| 4,915,261 A * | 4/1990 | Strenger | A47J 31/407 222/107 |
| 5,097,989 A | 3/1992 | Nakayama et al. | |
| 5,192,513 A * | 3/1993 | Stumphauzer | A23L 2/54 222/129.1 |
| 5,992,685 A * | 11/1999 | Credle, Jr. | B67D 1/0021 222/1 |
| 6,536,626 B2 | 3/2003 | Newman | |
| 6,751,525 B1 | 6/2004 | Crisp, III | |
| 6,986,263 B2 | 1/2006 | Crisp, III | |
| 7,032,780 B2 | 4/2006 | Crisp, III | |
| 7,594,525 B2 * | 9/2009 | Girard | A47J 31/407 141/351 |
| 8,250,972 B2 * | 8/2012 | Santoiemmo | B67D 1/0888 99/323.2 |

(Continued)

FOREIGN PATENT DOCUMENTS

WO    WO 00-09437    12/2000

*Primary Examiner* — Timothy L Maust
(74) *Attorney, Agent, or Firm* — Kirk A. Buhler; Buhler & Associates Patenting

(57) ABSTRACT

Improvements in a single serve point of consumption beverage dispensing valve is disclosed. The valve includes a fresh water input fitting, a carbonated water inlet fitting a vacuum pump that transfers concentrated from a flavor bullet and diffuses the concentrate with water an optionally carbonation to provide a consistent mixture. The flavor bullet manifold is self-cleaning to eliminate flavor cross-contamination. An initiation lever starts the mixing, diffusion and dispensing that is monitored and controlled with a micro water flow metering system that controls flow solenoids and dispensing of the mixed beverage.

5 Claims, 6 Drawing Sheets

(56) References Cited

U.S. PATENT DOCUMENTS

| | | | | |
|---|---|---|---|---|
| 8,544,692 B2* | 10/2013 | Rusch | ............. | B67D 1/0031 |
| | | | | 222/153.06 |
| 8,556,127 B2* | 10/2013 | Olson | ............. | C02F 1/003 |
| | | | | 222/162 |
| 9,783,405 B2* | 10/2017 | Olson | ............. | B67D 1/10 |
| 10,201,171 B2* | 2/2019 | Gordon | ............. | A23L 2/54 |
| 10,464,800 B2* | 11/2019 | Hevia | ............. | B67D 1/0888 |
| 2014/0175125 A1* | 6/2014 | Breault | ............. | B67D 1/004 |
| | | | | 222/129.1 |
| 2014/0263416 A1* | 9/2014 | Green | ............. | B67D 1/0021 |
| | | | | 222/1 |
| 2014/0331868 A1* | 11/2014 | Novak | ............. | B01F 3/04248 |
| | | | | 99/323.2 |
| 2015/0135965 A1* | 5/2015 | Lo Foro | ............. | A47J 31/3633 |
| | | | | 99/285 |
| 2015/0291409 A1* | 10/2015 | Crisp, III | ............. | B67D 1/0021 |
| | | | | 222/23 |
| 2015/0353335 A1* | 12/2015 | Breault | ............. | B67D 1/0021 |
| | | | | 222/129.1 |
| 2016/0009539 A1* | 1/2016 | Jersey | ............. | B67D 1/0044 |
| | | | | 222/460 |
| 2016/0023883 A1* | 1/2016 | Jersey | ............. | B67D 1/1204 |
| | | | | 222/434 |
| 2017/0101298 A1* | 4/2017 | Renzi | ............. | B67D 1/0855 |
| 2019/0330045 A1* | 10/2019 | Breault | ............. | B67D 1/0078 |
| 2020/0048066 A1* | 2/2020 | Breault | ............. | B67D 3/0019 |

* cited by examiner

SINGLE SERVE POINT OF CONSUMPTION BEVERAGE DISPENSING VALVE

CROSS REFERENCE TO RELATED APPLICATIONS

This application claims the benefit of Provisional Application Ser. No. 62/716,296 filed Sep. 8, 2018 the entire contents of which is hereby expressly incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

This invention relates to improvements in a beverage dispensing valve. More particularly, the present single serve point of consumption beverage dispensing valve reduces the overall size of prior art dispensing valves and provides superior performance.

Description of Related Art Including Information Disclosed Under 37 CFR 1.97 and 1.98

A beverage is a liquid drink for human consumption. Beverage varieties include, but are not limited to: water, alcoholic drinks, non-alcoholic drinks, carbonated drinks, fruit or vegetable Juice, and hot drinks (e.g., coffee, tea, and hot chocolate). Beverages of any variety are consumed by the general population on a daily basis.

Beverages, other than water, frequently involve complicated or lengthy preparations. As a result, large quantities of premade beverages are frequently canned or bottled for later consumption. Consuming canned or bottled beverages can be problematic. For instance, bottled or canned beverages, once opened, must be consumed within a relatively short period to avoid spoliation of the beverage (e.g., the flattening of a carbonated soda). Also, bottled or canned beverages can result in waste, particularly in the case of aluminum cans and plastic bottles. Finally, canned and bottled soda typically lacks the freshness of soda dispensed from a soda fountain. Dispensing carbonated single serve beverages requires a dispensing valve system that can properly mix and dispense the combination of water, syrup and carbonation.

Recently, there have been some developments in beverage makers or dispensers for home use. For instance, Sodastream® is a machine that allows a user to mix carbonated beverages at home. To use the Sodastream®, a reusable 1 L bottle that is only compatible with Sodastream® is placed into a pump so that carbon dioxide may be pumped into the water. Later, the carbonated water can be mixed with syrup to make a carbonated beverage. One downside of Sodastream® is that it does not create single servings of carbonated beverages. It must be mixed in 1 L batches, and not variable single servings. Another downside of the Sodastream® is that the user manually measures and mixes the syrup and carbonated water, which can lead to inconsistent flavors if a user adds too much or too little syrup.

Additional examples of patents and or publication that try to address this/these problem(s) are identified and discussed below.

Santioemmo (U.S. Pat. No. 8,250,972) teaches a device that can dispense single servings of carbonated beverages. Santioemmo's device works similar to single serve coffee machines. This patent discloses using premeasured amounts of syrup and mixes it with a predetermined amount of water. Santieommo's device mixes soda in a machine, but it can only do so in discrete serving sizes. For example, Santieommo's device might have three possible settings, such as 6 oz, 12 oz, and 16 oz. If the machine had only those three settings, a user would be unable to dispense a drink that was 10 oz.

Nakayama et al., (U.S. Pat. No. 5,097,989) teaches a beverage mixing and dispensing device for dispensing syrup from a syrup container and mixing the syrup with diluted water and carbonated water. The unit includes a body having a syrup flow path, a gas supply path, and a receiving portion for the syrup container. The interior of the syrup container is linked to the gas supply path which supplies carbon dioxide into the interior of the syrup container so as to drive the syrup out of the syrup container and into the syrup flow path. The syrup container is disposed in the receiving portion which includes a first and second hole such that the first hole is linked to the gas supply path and the second hole is linked to the syrup path. A projecting portion is integrally formed with the receiving portion and includes a separating wall which separates the first and second holes so as to prevent the carbon dioxide from flowing directly from the first hole to the second hole. Therefore, a constant rate of syrup is dispensed from the syrup container, independently of the volume of syrup remaining within the syrup container. While this patent discloses a dispensing apparatus the size and construction are not conducive for use with a single serve dispensing nozzle.

What is needed is needed is a post mix dispensing valve. The proposed dispensing valve disclosed in this document provides the solution.

BRIEF SUMMARY OF THE INVENTION

It is an object of the present invention to provide a dispenser of carbonated drinks that is small enough for at home use. This allows a homeowner to produce carbonated beverages in a container of their own choosing without disposing of a can or bottle after the beverage has been consumed.

It is another object of the present application to dispense carbonated drinks in variable serving sizes. A user may just want a serving of several ounces, as taste or as a mixer, while another user may want to fill a container to enjoy at a distal location. The variable amount of dispensing provides a solution to both users. In both cases the variable quantities must be dispensed with consistent flavor.

It is another object of the single serve point of consumption beverage dispensing valve to properly and consistently mix a combination of chilling water in a water source, pumping the water past the outlet of a flavor injector and dispensing said water. In this method, syrup may suitably be sucked into the flavor injector using the Venturi effect to create a flavored beverage.

It is still another object of the single serve point of consumption beverage dispensing valve to be virtually maintenance free and configurable to retro-fit into most post-mix fountain dispensing systems.

Various objects, features, aspects, and advantages of the present invention will become more apparent from the following detailed description of preferred embodiments of the invention, along with the accompanying drawings in which like numerals represent like components.

BRIEF DESCRIPTION OF THE SEVERAL VIEWS OF THE DRAWING(S)

DETAILED DESCRIPTION OF THE INVENTION

Figure 1:
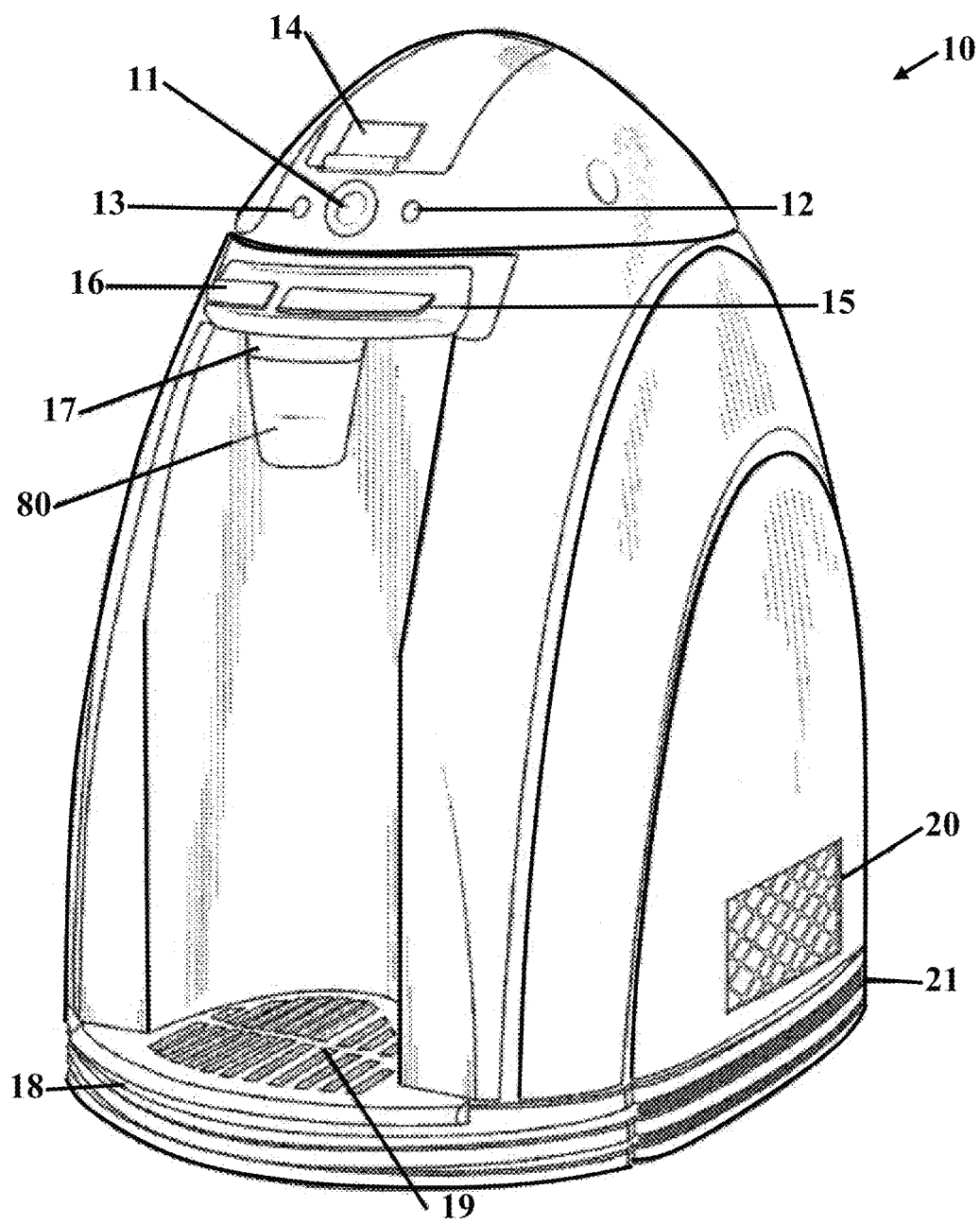
FIG. 1 is a perspective view of the soft drink dispenser.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, but is merely representative of various embodiments of the invention. The illustrated embodiments of the invention will be best understood by reference to the drawings, wherein like parts are designated by like numerals throughout.

| Item Numbers and Description | |
|---|---|
| 10 drink dispenser | 11 power button |
| 12 carbon dioxide light | 13 water light |
| 14 door | 15 soda water dispensing button |
| 16 water dispensing button | 17 flavor diffusor |
| 18 drip tray | 19 splash guard |
| 20 thermoelectric chiller | 21 light |
| 22 housing | 23 cavity |
| 24 opening pin | 25 bayonet connection |

| Item Numbers and Description | |
|---|---|
| 26 sealing washer | 27 housing taper |
| 28 rib | 29 side walls |
| 30 single serve point of consumption beverage dispensing valve | |
| 31 water connection | 32 CO2 connection |
| 33 flow path | |
| 34 single serve point of consumption beverage dispensing valve | |
| 35 water meter valve | |
| 40 fill hole | 41 water inlet |
| 42 carbonated water inlet | 43 water solenoid |
| 44 carbonated water solenoid | 50 door |
| 51 open | 52 door |
| 53 close | 60 initiation lever |
| 54 vacuum pump | 55 door actuator arm |
| 61 contact tab | 70 motor |
| 71 pulley | 72 pulley |
| 73 belt | 74 screw drive |
| 75 guides | 76 compression paddle |
| 77 nut | 80 nozzle |
| 81 nozzle connection | 90 flavor bullet |
| 91 insert | 92 seal |
| 93 syrup accordion pouch | 94 cap |
| 95 outer shell | 96 exit port |
| 97 accordion bellows | 98 down |

FIG. 1 is a front perspective view of the preferred embodiment of the drink dispenser machine 10 as it is assembled for use. In this particular embodiment, the machine features a parabolic-type shape. The exterior of the machine can be made of durable plastic capable of withstanding hot or cold temperatures. When using the dispenser, a user turns the machine 10 on and off with the power button 11. The power button 11 is located near the top of the machine 10 in the center but could be located in other locations on the machine 10. On either side of the power button are two lights. The carbon dioxide light 12 is suitably located on the right of the power button 11. The carbon dioxide light 12 turns red when the machine needs a refill of carbon dioxide. On the left of the power button 10 is a water light 13. The water light 13 will turn red when the machine needs a refill of water. Above the power button 11 is the door 14 that provides access to a flavor port that is shown and described in other figures herein. A flavor bullet 90 (see FIG. 2) is inserted into the opened door 14 into the drink dispenser 10. The flavor bullet contains a concentrated drink mix that will blend with either still water or soda water to create a beverage.

Underneath the power button 2 and lights are two additional buttons. The soda water dispensing button 15 is located on the right. When the soda water dispensing button 15 is pushed, the machine will dispense a carbonated beverage in a steady stream. If there is no flavor bullet inserted then the machine 10 will dispense straight soda water. If there is a flavor bullet then the machine 10 will dispense a flavored, carbonated beverage of choice. While the soda water dispensing button 15 is being pressed, the machine will continue to dispense the beverage. This allows a user to choose the serving size he/she wishes to consume. By pressing the soda dispensing button 15 for a short time, the machine will dispense a small amount of beverage. If a user presses the soda dispensing button 15 for a longer period of time, then the machine will dispense a larger serving of beverage.

To the left of the soda water dispensing button 15, is the water dispensing button 12. When a user pushes the water dispensing button 16, the machine will dispense non-carbonated water if there is no flavor bullet. If there is a flavor bullet then the machine 10 will dispense a non-carbonated drink, such as juice or sports drink. The water dispensing button 16 typically works like the soda dispensing button 15. A user can choose the serving size based on the length of time he/she holds down on the water dispensing button 16.

When the drink dispenser dispenses a beverage, the contents, i.e. syrup and water, flow through the flavor diffuser 17. The diffuser 17 aids in mixing the syrup and water by slowing down the flow of the liquids. The diffuser 17 may be a commercially available product or it may be a diffuser 17 specially fitted to accompany the present invention. The diffuser 17 aids in making the taste of the beverages consistent. The diffuser 17 is made of a dishwasher safe plastic and can be easily washed to maintain a consistent quality to the drinks. Once the drink has been mixed in the diffuser 17, the drink will be dispensed through the nozzle 80. The nozzle 16 will also be made of a dishwasher safe material and is capable of being removed and replaced.

At the base of the machine, there is a drip tray 18 and a splash guard 19. The drip tray 18 is a shallow container at the base of the machine. The drip tray 18 can trap liquid that inadvertently drips from the nozzle 80. A splash guard 19 covers the top of the drip tray 18. The splash guard 19 has a grill like surface that allows liquids to trickle into the drip tray 18. The splash guard 19 minimizes splash that might occur from an accidental spill. Both the drip tray 18 and the splash guard 19 are removable and made of a dishwasher safe material.

The drinks that are dispensed from the machine are preferably cold by virtue of a thermoelectric chiller 20. The thermoelectric chiller 20 works by having current flow through two conductors. The thermoelectric chiller 20 uses thermoelectric technology to chill the temperature of the water so that drinks dispensed from the machine are at a cool temperature as if they had just come out of a refrigerator. When current flows through two different conductors, heat can be generated or removed at the junction point. A thermoelectric mechanism creates a hot sink and a cold sink and heat can be extracted away from the chiller using a fan. The cold sink lowers the temperature of the water. This is similar to technology found in dispensers that dispense cold filtered water. When the power to the machine described in the present invention is turned on, the thermoelectric chiller 20 will begin to chill water stored in the machine. If the user chooses to connect the machine to a live water line, the thermoelectric technology will work in a similar manner to filtered water within the dispenser so a constant supply of cold water is available.

Just below the thermoelectric cooler 20 is a light 21. In this embodiment, the two strips just below the cooler light up when the machine is turned on. The light 21 provides illumination if the lighting is minimal. The machine can also be made without the light 21. While this example shows a stand-alone dispensing machine, the dispensing valve can also be used in an integrated dispenser in a refrigerator.

Figure 2:
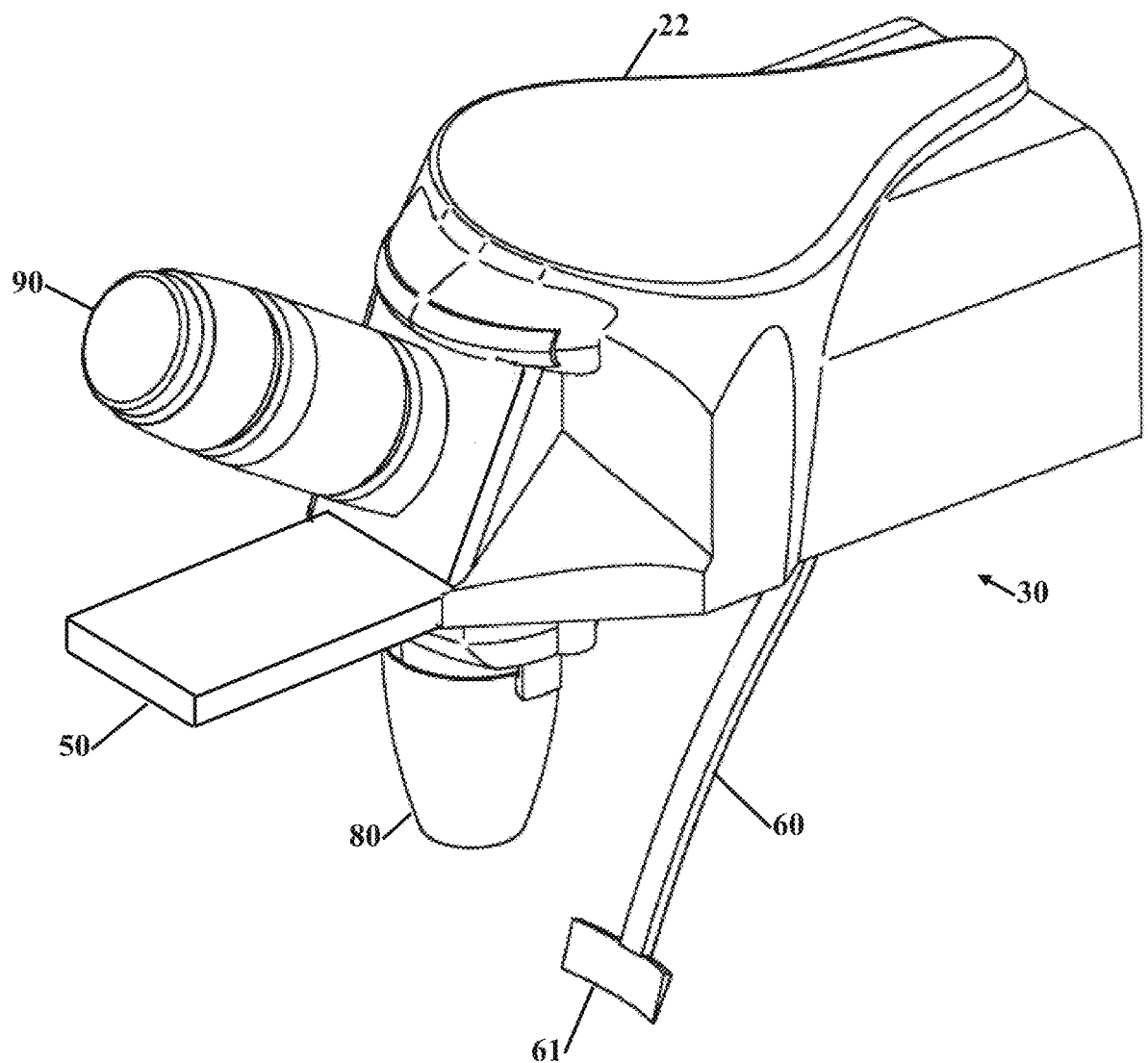
FIG. 2 shows a single serve point of consumption beverage dispensing valve.

FIG. 2 shows a single serve point of consumption beverage dispensing valve 30. This valve system is configured to mount directly into new or existing single serving dispensing system. The housing 22 is a single unit with internal mixing features that properly blends the concentrate in the flavor bullet 90 to dispense the mixture out of the nozzle 80. The open access door 50 is shown open to accept the flavor bullet 90. The assembly 30 has a locating and initiation lever arm 60 with a contact tab 61 that provides a locating mechanism for a cup or glass and starts the mixing and flow.

The dispensing valve assembly 30 uses flavor bullets 90 that eliminates sticky syrup lines, expensive cold plates post mix valves and Bag-In-Box Pumps. There is no need for expensive Bag-In-Box pumps which often fail. The dispensing valve assembly pours just the right amount of water to syrup ratio each time plus it knows whether to pour carbonated or non-carbonated water with your drink selection.

The security door 50 opens when presented with a purchased bullet 90 and will only pour that bullet 90 once. After the bullet 90 is removed the security door 50 closes immediately and cleans the cavity to ensure zero cross-contamination between drinks. The system is powered by a 12-volt DC power supply to control valves and actuator motor(s) and supply power to the logic, control integrated circuit to allow the controlling software to operate.

Figure 3:
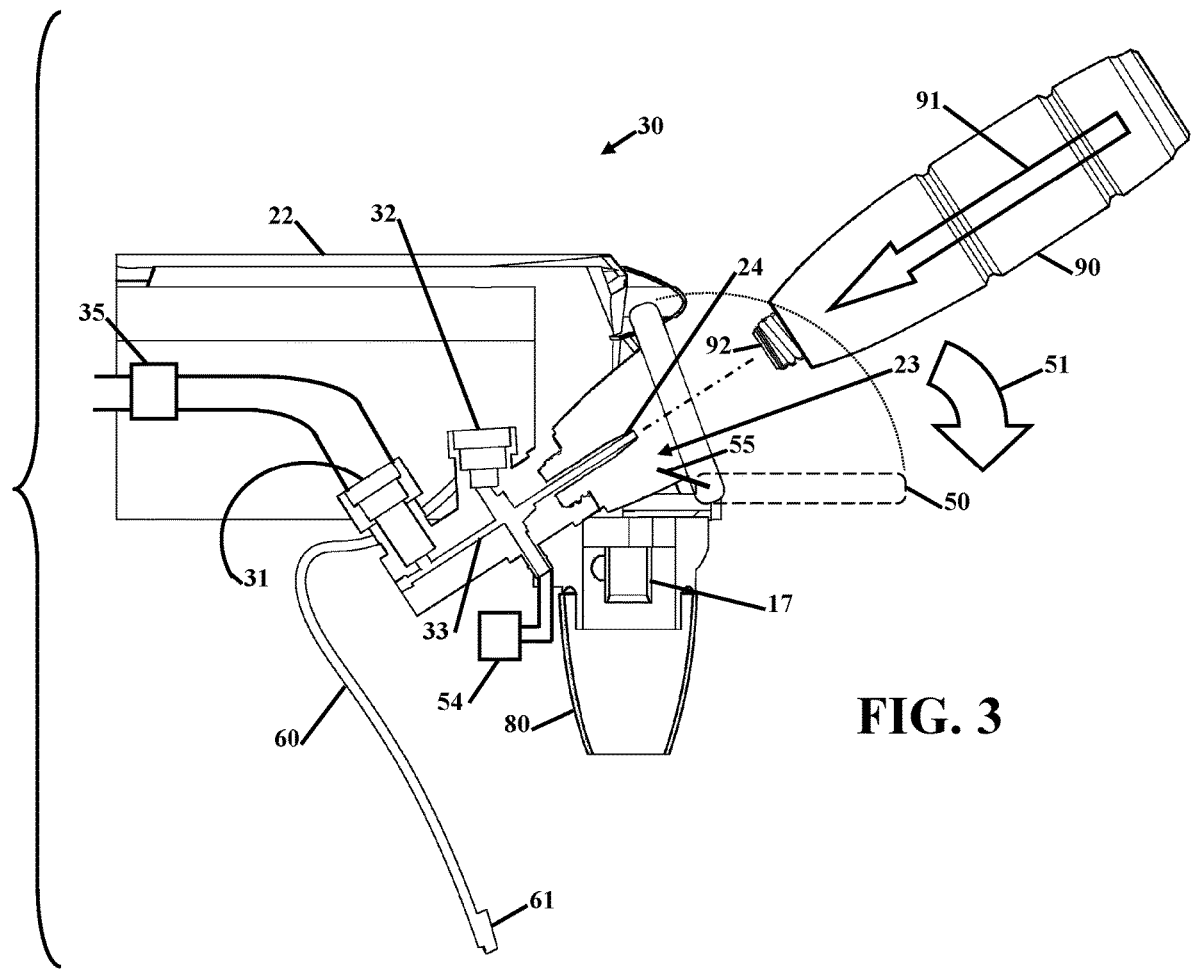
FIG. 3 shows a cross-sectional view of the single serve point of consumption beverage dispensing valve with the flavor bullet displaced.
Figure 4:
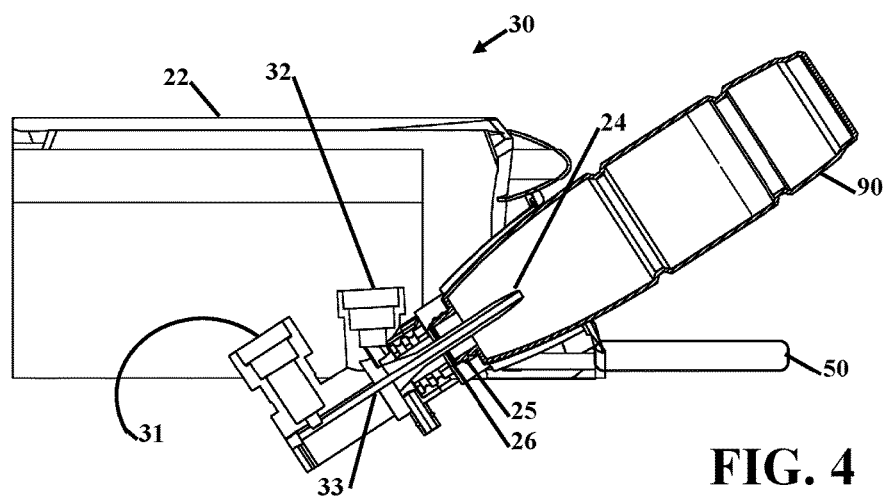
FIG. 4 shows a cross-sectional view of the single serve point of consumption beverage dispensing valve with the flavor bullet installed.

FIG. 3 shows a cross-sectional view of the single serve point of consumption beverage dispensing valve 30 with the flavor bullet 90 displaced and FIG. 4 shows a cross-sectional view of the single serve point of consumption beverage dispensing valve 30 with the flavor bullet 90 installed within the cavity 23. The valve system is enclosed in a housing 22. The flavor bullet 90 is a concentrated flavor and is available in a variety of flavors to make a drink of nearly any combination. The flavor bullet 90 is inserted 91 and upon installation a seal 92 at the end of the flavor bullet 90 is ruptured with the opening pin 24. Upon insertion, a bayonet connection 25 secures the flavor bullet 90 within and against a sealing washer 26 that secures the flavor bullet 90 and seals the flavor bullet 90 into the dispensing valve assembly 30. The opening pin 24 has a hollow center that can pump fluid concentrate out of the flavor bullet 90 and can inject air or water into the flavor bullet 90 to extract concentrate from within the flavor bullet 90.

The syrup from within the flavor bullet 90 is extracted with a high-pressure vacuum pump 54 that is food and/or surgical grade. As the syrup is extracted from the flavor bullet 90 with control of a syrup control solenoid. The syrup is injected with a micro-pour system that detects the flow rate and mix rate to ensure a proper blend of water that is connected to the fresh water connection inlet fitting 31 and the CO2 connection fitting 32. The flow of water is controlled with a micro water meter valve 35 that measures the water delivery rate at a high resolution to accurately blend concentrated syrup with a proprietary syrup injector with a micro-pour detector.

Each flavor bullet 90 has an RFID tag or other equivalent mechanism or label that the dispenser uses to determine the syrup and requirement for CO2 gas. The RFID tag provides a unique identifier provides two functions. First, it is used by the dispensing mechanism to determine the amount of syrup, carbonation and water to blend with the flavor bullet 90. The second function of the RFID is to identify where the specific flavor bullet 90 was purchased or taken. When the flavor bullet 90 is inserted into a dispenser the flavor bullet 90 is scanned and the unique ID allows for proper crediting or charging of the person or account as inventory management. In this example, if a person removes a flavor bullet from a club and uses the flavor bullet 90 at home, the club is credited for the flavor bullet. When the RFID of the flavor bullet 90 is credited or charged a security door actuator arm 55 opens 51 to allow for insertion of the flavor bullet 90. After the syrup has been used, withdrawing the flavor bullet 90 will activate the door actuator arm 55 to close the door 50.

After the door closes or is closed a manifold is used for self-cleaning the bullet cavity 23 and the gas injected carbonation areas to eliminate cross-contamination from one drink to another. The valve system has an initiation lever 60 with a contact tab. Depressing the lever 60 starts the dispensing process. The water CO2 and syrup flows through the flow path 33 and into the flavor diffusor 17 where the mixture is dispensed out of the water syrup injection spout or nozzle 80.

Figure 5:
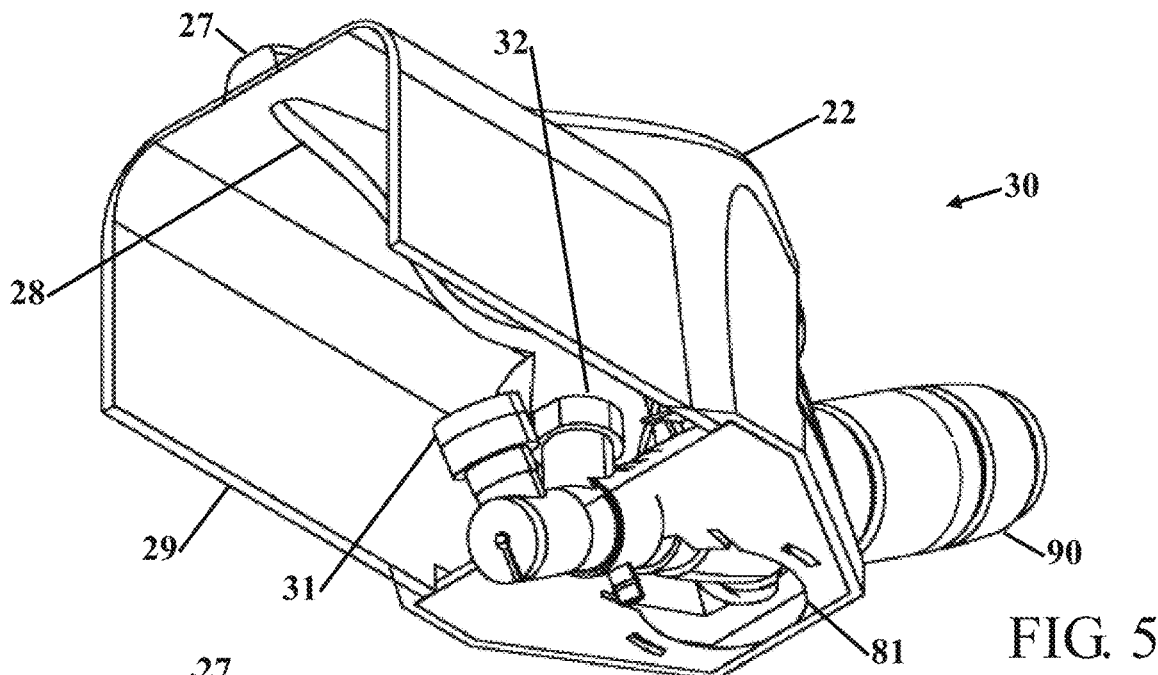
FIG. 5 shows a lower rear perspective view of the single serve point of consumption beverage dispensing valve.
Figure 6:
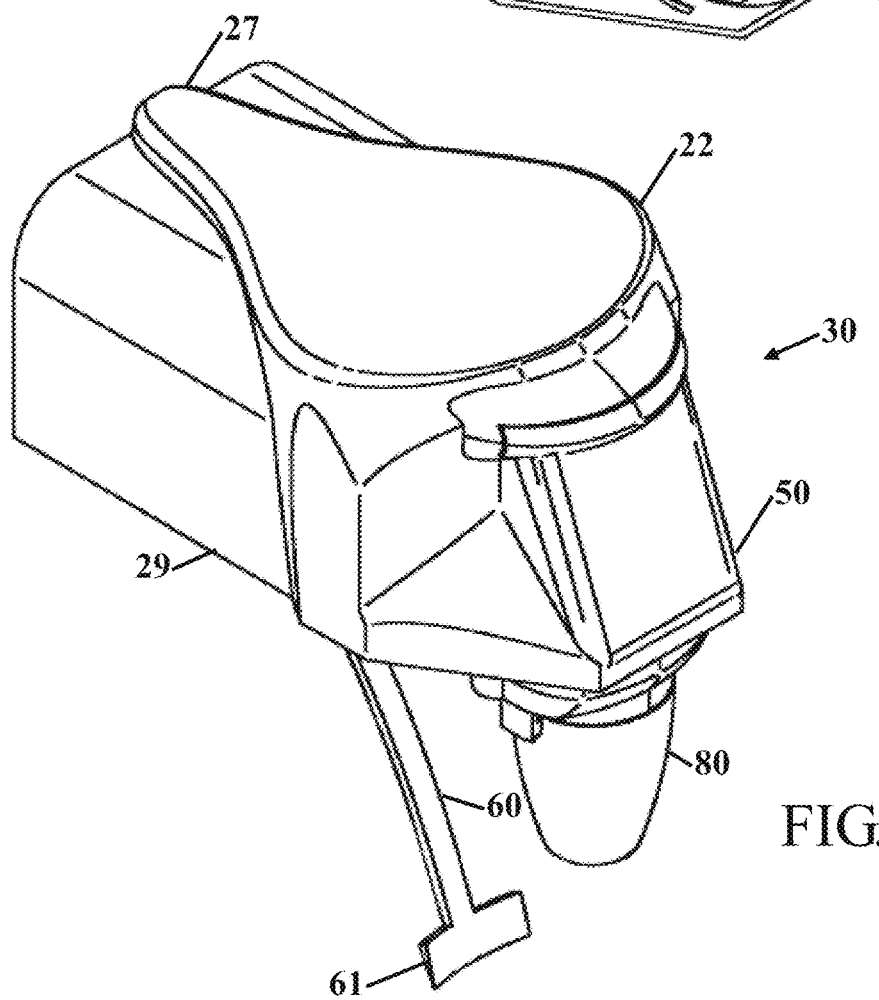
FIG. 6 shows an upper front perspective view of the single serve point of consumption beverage dispensing valve with the door closed.

FIG. 5 shows a lower rear perspective view of the single serve point of consumption beverage dispensing valve with a flavor bullet 90 installed and FIG. 6 shows an upper front perspective view of the single serve point of consumption beverage dispensing valve with the door closed 50. The valve assembly 30 is enclosed with a custom plastic housing 22. The housing has a housing taper 27 and a rib 28 to center and locate the housing and side walls 29 to protect the internal mechanism. Within the housing 22 is a front-end control circuit board. From FIG. 5 the water connection 31 and the CO2 connection 32 is visible. Also visible in this view is the nozzle connection 81 where the dispensing nozzle 80 connects (as shown in FIG. 6). In FIG. 6 the initiation lever 60 with the contact tab 61 is shown at the bottom of the drawing.

Figure 7:
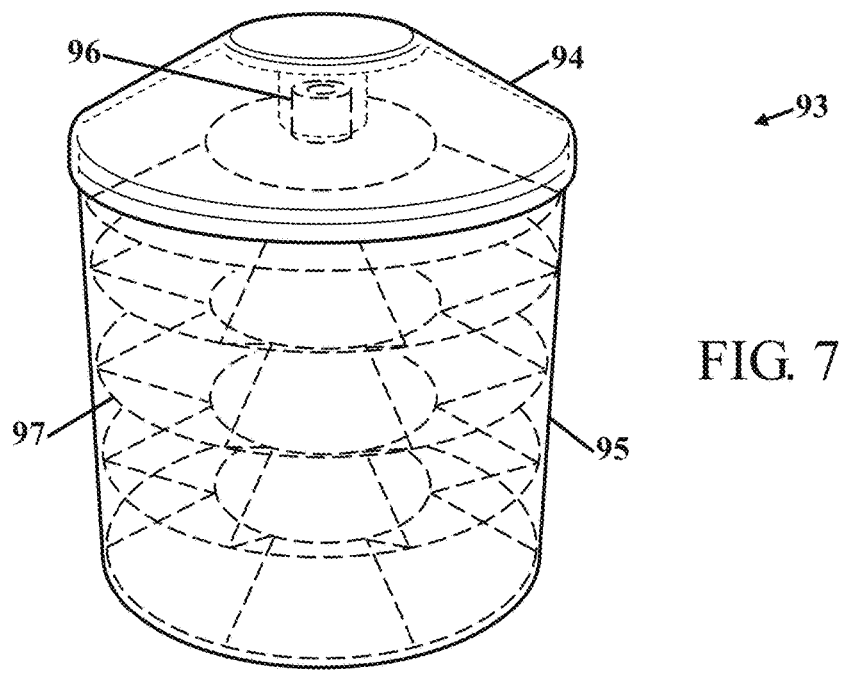
FIG. 7 shows an alternative embodiment of a syrup accordion pouch.

FIG. 7 shows an alternative embodiment of a syrup accordion pouch 93. Within the syrup accordion pouch 93 is a container with accordion bellows 97 within an outer shell 95. The outer shell can be fabricated from a variety of materials such as paper, cardboard, plastic, foil or other material that is easily crushed. The container with accordion bellows 97 is filled with the desired flavor and has an exit port 96 where the fluid from within the container with accordion bellows 97 is expelled. Each syrup accordion pouch 93 can have an RFID tag or other equivalent mechanism or label that the dispenser uses to determine the syrup and requirement for CO2 gas.

The RFID tag provides a unique identifier provides two functions. First, it is used by the dispensing mechanism to determine the amount of syrup, carbonation and water to blend with the syrup accordion pouch 93. The second function is to identify where the specific syrup accordion pouch 93 was purchased or taken. When the flavor bullet 90 is inserted into a dispenser the syrup accordion pouch 93 is scanned and the unique ID allows for proper crediting or charging of the person or account as inventory management. In this example, if a person removes a flavor bullet from a club and uses the syrup accordion pouch 93 the proper person or account can be billed, charged, credited and/or inventory controlled for future inventory control or replacement.

The syrup accordion pouch 93 is preferably made from biodegradable material(s). The diameter of the exit port 96 is sized to reduce the potential for fluid from leaking out of the container with accordion bellows 97 without the syrup accordion pouch 93 being compressed. The top of the syrup accordion pouch 93 has a removable cap 94 that closes the exit port 96. When a user wants to use the syrup accordion pouch 93 the cap is removed and the flavor bullet is inverted and placed within the single serve point of consumption beverage dispensing valve 34 shown in the following figures.

Figure 8:
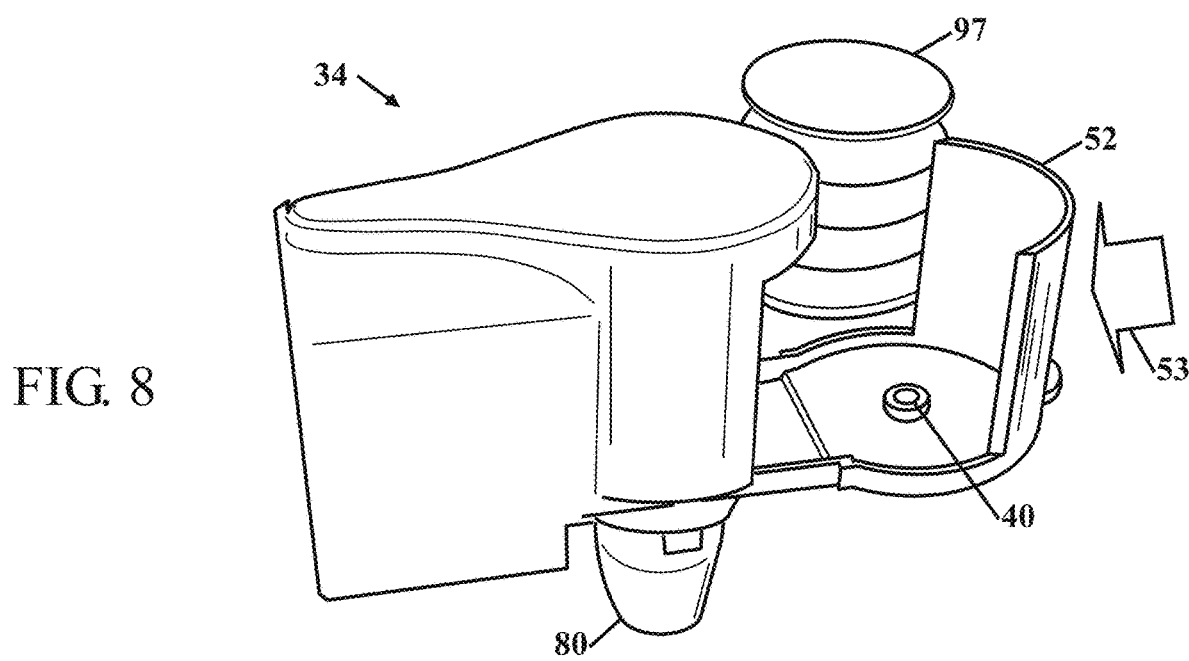
FIG. 8 shows a top perspective view of an alternate embodiment of a single serve point of consumption beverage dispensing valve with a syrup accordion pouch.

FIG. 8 shows a top perspective view of an alternate embodiment of a single serve point of consumption beverage dispensing valve 34 with a syrup accordion pouch 93. A syrup accordion pouch 93 is inserted into within the door 52 so the exit port of the syrup accordion pouch 93 is placed into the dispensing hole 40. A user slides or otherwise closes 53 the door 52 that secures the syrup accordion pouch 93 within the single serve point of consumption beverage dispensing valve 34. The dispensing hole aligns with the center of the nozzle 80. When syrup from within the syrup accordion pouch 93 is expelled water or carbonated water washes around the dispensing syrup to prevent and contact of syrup with the single serve point of consumption beverage dispensing valve 34.

Figure 9:
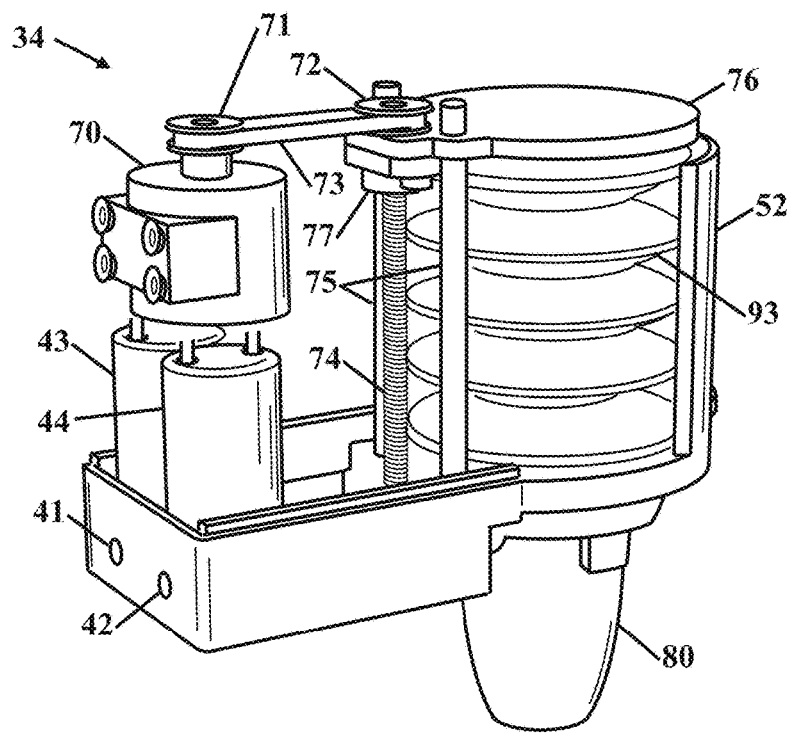
FIG. 9 shows the single serve point of consumption beverage dispensing valve, with the outer housing removed, with a full syrup accordion pouch installed.
Figure 10:
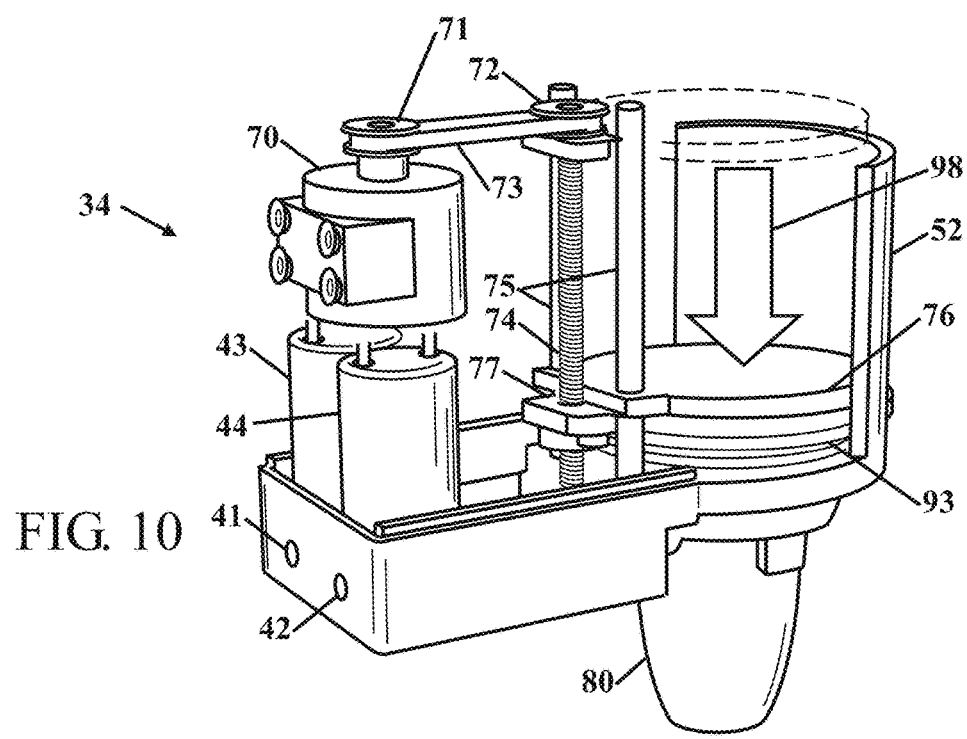
FIG. 10 shows the single serve point of consumption beverage dispensing valve, with the outer housing removed, with a dispensed syrup accordion pouch.

FIG. 9 shows the single serve point of consumption beverage dispensing valve 34, with the outer housing removed, with a full syrup accordion pouch 93 installed and FIG. 10 shows the single serve point of consumption beverage dispensing valve 34, with the outer housing removed, with a dispensed syrup accordion pouch 93. Prior to placing a full syrup accordion pouch 93 within the dispensing unit a compression paddle 76 is elevated to a top position so the syrup accordion pouch 93 can be pushed into the dispenser. A mechanical or optical sensor can determine if the syrup accordion pouch 93 has been properly inserted, information regarding the type of syrup can be determined for the required mix. The dispenser is shown with two water inputs 41 and 42 for flat water and carbonated water. Flow of water from the inputs are controlled by solenoid valves 43 and 44. The flat and carbonated water will then flow into the brixing chamber where it is mixed with fluid from the syrup accordion pouch 93 and flows out of the nozzle 80.

To mix water with syrup within the syrup accordion pouch 93, motor 70 is turned which turns a pulley 71 that moves a belt 73 that turns a pulley 72 to create a compression drive system. The motor 70 can be a stepper motor, servo motor or other type of motor where the position of the motor 70 can be controlled or known. Pulley 72 has a threaded nut 77 that is threaded onto screw drive 74. Turning the threaded nut 77 will move the compression paddle 76 to squeeze the syrup accordion pouch 93 and push syrup out into the brixing chamber where it will mix and be dispensed out of the nozzle 80. The pulley motor turns the worm drive shaft to move the compression paddle 76 down 98 to compress the syrup accordion pouch 93 to evenly allow for consistent brix ration of the drink that is being dispensed. Guides 75 ensure that the compression paddle 76 is translated to expel syrup from the syrup accordion pouch 93. A sensor determines when the syrup accordion pouch 93 is empty and will stop the flow of water. After the syrup is dispensed the compression paddle 76 can be elevated to allow for removal of the empty syrup accordion pouch 93.

Thus, specific embodiments of a single serve point of consumption beverage dispensing valve have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. A single serve point of consumption beverage dispensing valve comprising:
   a fresh water inlet that is connected to a first solenoid;
   a carbonated water inlet that is connected to a second solenoid;
   at least one flavor bullet that has an RFID tag wherein when said RFID tag; is read and credited or charged, a door is controlled with a door actuator arm that opens said door to allow for insertion of said at least one flavor bullet;
   a vacuum pump connected to a syrup port that is configured to accept a flavor bullet containing syrup;
   whereby a flow meter valve controls and regulates flow of fresh water, carbonated water and syrup out of a brixing diffuser nozzle.

2. The single serve point of consumption beverage dispensing valve according to claim 1, further includes a flavor diffusor.

3. The single serve point of consumption beverage dispensing valve according to claim 1, further includes a sensor that determines when said flavor bullet is empty.

4. The single serve point of consumption beverage dispensing valve according to claim 1, further includes a paddle that starts a flow of beverage that is being dispensed.

5. The single serve point of consumption beverage dispensing valve according to claim 1, further includes an opening pin with a hollow center where syrup is drawn through said flavor bullet.

\* \* \* \* \*